(12) United States Patent
Fujikane et al.

(10) Patent No.: US 9,540,256 B2
(45) Date of Patent: Jan. 10, 2017

(54) LIQUID TREATMENT DEVICE, LIQUID TREATMENT METHOD, AND PLASMA TREATMENT LIQUID

(71) Applicant: PANASONIC INTELLECTUAL PROPERTY MANAGEMENT CO., LTD., Osaka (JP)

(72) Inventors: Masaki Fujikane, Osaka (JP); Mari Onodera, Osaka (JP); Hironori Kumagai, Osaka (JP); Shin-ichi Imai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 27 days.

(21) Appl. No.: 14/662,182

(22) Filed: Mar. 18, 2015

(65) Prior Publication Data

US 2015/0191371 A1    Jul. 9, 2015

Related U.S. Application Data

(63) Continuation of application No. PCT/JP2014/002500, filed on May 12, 2014.

(30) Foreign Application Priority Data

May 14, 2013    (JP) ................................. 2013-102306

(51) Int. Cl.
    *C02F 1/46*      (2006.01)
    *H05H 1/24*      (2006.01)
    *B01J 19/08*     (2006.01)

(52) U.S. Cl.
    CPC ............ *C02F 1/4608* (2013.01); *B01J 19/088* (2013.01); *H05H 1/2406* (2013.01);
    (Continued)

(58) Field of Classification Search
    CPC ........... C02F 1/463; C02F 1/4608; C02F 1/36; C02F 2101/308; C02F 2103/28; C02F 2305/023; C02F 2209/05; B29C 35/08
    See application file for complete search history.

(56) References Cited

U.S. PATENT DOCUMENTS

| 5,464,513 A | 11/1995 | Goriachev et al. |
| 5,630,915 A | 5/1997 | Greene et al. |

(Continued)

FOREIGN PATENT DOCUMENTS

| CN | 101047114 A | 10/2007 |
| CN | 101795979 A | 8/2010 |

(Continued)

OTHER PUBLICATIONS

Machine translation of JP 2012-075981 A, Apr. 19, 2012.*

(Continued)

*Primary Examiner* — Walter D Griffin
*Assistant Examiner* — Cameron Allen
(74) *Attorney, Agent, or Firm* — McDermott Will & Emery LLP

(57) ABSTRACT

The present disclosure provides a liquid treatment device, a liquid treatment method, and a plasma treatment liquid each capable of efficiently generating plasma and treating a liquid in a short time period. A liquid treatment device according to the present disclosure includes a first electrode, a second electrode disposed in a liquid to be treated, an insulator disposed around the first electrode with a space between the first electrode and the insulator, the insulator has an opening portion in a position in contact with the liquid to be treated, a power supply that applies voltage between the first electrode and the second electrode, and a supply device supplying a liquid to the space before the power source applies the voltage.

15 Claims, 5 Drawing Sheets

(52) U.S. Cl.
CPC  *B01J 2219/0809* (2013.01); *B01J 2219/0815* (2013.01); *B01J 2219/0894* (2013.01); *C02F 2201/46* (2013.01); *C02F 2201/46175* (2013.01); *C02F 2303/04* (2013.01); *H05H 2001/2418* (2013.01)

(56) References Cited

U.S. PATENT DOCUMENTS

| | | |
|---|---|---|
| 2007/0235426 A1 | 10/2007 | Matsumoto et al. |
| 2011/0005261 A1 | 1/2011 | Lee et al. |
| 2011/0005794 A1 | 1/2011 | Lee et al. |
| 2011/0011268 A1 | 1/2011 | Lee et al. |
| 2011/0017610 A1 | 1/2011 | Hahn et al. |
| 2012/0048792 A1 | 3/2012 | Saitou et al. |
| 2012/0145679 A1 | 6/2012 | Matsumoto et al. |
| 2012/0156093 A1 | 6/2012 | Kitano |
| 2013/0098753 A1 | 4/2013 | Sanematsu |
| 2013/0152982 A1 | 6/2013 | Tanaka et al. |
| 2013/0334955 A1 | 12/2013 | Saitoh et al. |
| 2014/0014516 A1* | 1/2014 | Kumagai ............. C02F 1/4608 204/556 |
| 2014/0054242 A1 | 2/2014 | Imai |

FOREIGN PATENT DOCUMENTS

| | | |
|---|---|---|
| CN | 101959802 A | 1/2011 |
| CN | 102428034 A | 4/2012 |
| CN | 103096783 A | 5/2013 |
| DE | 102010060762 A1 | 5/2012 |
| EP | 2072471 A1 | 6/2009 |
| JP | 10-263387 A | 10/1998 |
| JP | 2000-093972 A | 4/2000 |
| JP | 2005-058887 A | 3/2005 |
| JP | 2007-207540 A | 8/2007 |
| JP | 3983282 B2 | 9/2007 |
| JP | 4041224 B2 | 1/2008 |
| JP | 2008-178870 A | 8/2008 |
| JP | 2010-128754 A | 6/2010 |
| JP | 4784624 B2 | 10/2011 |
| JP | 2012-011301 A | 1/2012 |
| JP | 2012-043769 A | 3/2012 |
| JP | 2012-075981 A | 4/2012 |
| WO | 2012/132596 A1 | 10/2012 |
| WO | 2012/157034 A1 | 11/2012 |
| WO | 2012/157248 A1 | 11/2012 |
| WO | 2013/049902 A1 | 4/2013 |

OTHER PUBLICATIONS

International Search Report issued in International Application No. PCT/JP2014/002500 with Date of mailing Aug. 5, 2014, with English Translation.

International Preliminary Report on Patentability mailed Nov. 26, 2015 in International Patent Application No. PCT/JP2014/002500 (English translation thereof).

Thinese Office Action dated Dec. 14, 2016 issued in Chinese Patent Applicaton No. 201480002417.X (English translation).

Chinese Office Action and Search Report dated May 24, 2016 issued in Chinese Patent Application No. 201480002417.X (English translation of Search Report).

* cited by examiner

LIQUID TREATMENT DEVICE, LIQUID TREATMENT METHOD, AND PLASMA TREATMENT LIQUID

CROSS-REFERENCE

This is a continuation application of International Application No. PCT/JP2014/002500, with an international filing date of May 12, 2014, which claims priority of Japanese Patent Application No. 2013-102306 filed on May 14, 2013, the content of which is incorporated herein by reference.

DESCRIPTION OF THE RELATED ART

The present disclosure relates to a plasma treatment device a liquid treatment method, and a plasma treatment liquid which generate plasma in a liquid to treat the liquid or particularly to treat water.

Conventional liquid treatment devices include a device using high-voltage pulse discharge (see, e.g., Patent Literature 1 (Japanese Patent No. 4784624)). FIG. 8 is a configuration diagram of a conventional liquid treatment device (a sterilizing device). A sterilizing device 1 shown in FIG. 8 includes a discharge electrode 6 which is paired a bar-shaped high voltage electrode 2 with a plate-shaped grounding electrode 3. The high voltage electrode 2 is coated with an insulator 4 except an end surface of a tip portion 2a to form a high voltage electrode portion 5. The tip portion 2a of the high voltage electrode 2 and the grounding electrode 3 are immersed in a liquid to be treated 8 in a treatment tank and are oppositely disposed to each other at a predetermined electrode interval. The high voltage electrode 2 and the grounding electrode 3 are connected to a power source 9 generating a high voltage pulse. A negative-polarity high voltage pulse of 2 to 50 kV at 100 Hz to 20 kHz is applied between the both electrodes to cause a discharge. Evaporation of water due to the energy thereof and vaporization associated with shock waves generate air bubbles 10 composed of water vapor (a flash boiling phenomenon). Plasma generated in the vicinity of the high voltage electrode 2 generates OH, H, O, $O_2^-$, $O^-$, and $H_2O_2$ for sterilization of microorganisms and bacteria.

Another conventional liquid treatment device supplies a gas from a tube type electrode to a treatment tank to create a state in which a liquid to be treated and air bubbles are interposed between electrodes, and a high voltage pulse is applied between the electrodes to generate plasma for treating the liquid (see, e.g., Patent Literature 2 (Japanese Patent No. 4041224)). This liquid treatment device can generate plasma for treating liquid even when the high voltage pulse applied between the electrodes is a low voltage and therefore can reduce a power consumption. A liquid contamination removal device is disclosed that has a series of pulsed electric arc generating electrodes arranged in a liquid to promote arcs in the liquid by injecting a gas through one of the electrodes (see, e.g., Patent Literature 3 (Japanese Patent No. 3983282)).

SUMMARY

The devices of the conventional configurations described above, however, have a problem that a long time is taken for treatment of liquid because of a low plasma generation efficiency.

Therefore, one non-limiting and exemplary embodiment provides a liquid treatment device and a liquid treatment method each capable of generating plasma efficiently and treating a liquid within a short period of time, and a plasma treatment liquid being treated by the liquid treatment device or the liquid treatment method.

In one general aspect, a liquid treatment device according to the present disclosure includes:
a first electrode;
a second electrode disposed in a liquid to be treated;
an insulator disposed around the first electrode with a space between the first electrode and the insulator, wherein the insulator has an opening portion in a position in contact with the liquid to be treated;
a power source applying voltage between the first electrode and the second electrode so as to generate plasma in the vicinity of the opening portion of the insulator; and
a supply device supplying a liquid through a path which is different from the opening portion to the space before the power source applies the voltage.

These general and specific aspects may be implemented using a liquid treatment device, a liquid treatment method, and any combination of liquid treatment devices and liquid treatment methods.

The liquid treatment device, the liquid treatment method, and the plasma treatment liquid, plasma according to the present disclosure are capable of treating a liquid in a short time by generating plasma effectively.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
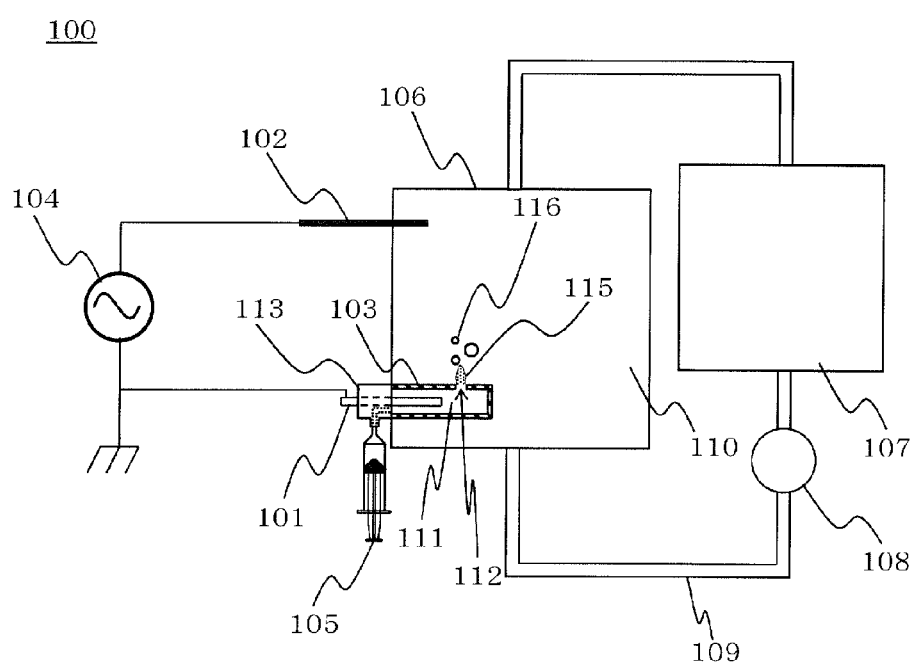
FIG. 1 shows a schematic of an overall configuration of a liquid treatment device according to a first embodiment of the present disclosure.

A liquid treatment device according to a first aspect of the present disclosure includes:
a first electrode;
a second electrode disposed in a liquid to be treated;

an insulator disposed around the first electrode with a space between the first electrode and the insulator, wherein the insulator has an opening portion in a position in contact with the liquid to be treated;

a power source applying voltage between the first electrode and the second electrode so as to generate plasma in the vicinity of the opening portion of the insulator; and a supply device supplying a liquid through a path which is different from the opening portion to the space before the power source applies the voltage.

With such a configuration, since the plasma can efficiently be generated and long-life OH radicals can be generated as compared to a conventional device, the liquid to be treated can be treated within a short period of time. A product generated by the plasma can be controlled by the liquid supplied from the supply device, and a substance in the liquid to be treated can be decomposed by the product efficiently within a short period of time.

In a liquid treatment device according to a second aspect of the present disclosure, the supply device according to the first aspect supplies the liquid to the space to form a state in which the space is filled with the liquid, the power source applies voltage between the first electrode and the second electrode after the space is filled with the liquid to evaporate the liquid in the space so as to generate a gas, and to discharge in the gas when the gas is released from the opening portion of the insulator into the liquid to be treated so as to generate the plasma.

With such a configuration, since a space formed between the first metal electrode and the insulator is filled with the liquid, air in the space can be removed. As a result, as compared to the case of filling the space with air, an amount of a nitrogen compound generated by the plasma can be reduced. In other words, an amount of the nitrogen compound generated by the plasma can be controlled by using the liquid, for example, the liquid to be treated, supplied from the supply device. By reducing the generated nitrogen compound in this way, the energy of the plasma is not consumed by a process of generating the nitrogen compound and the OH radicals can efficiently be generated. As a result, the liquid to be treated can be treated within a short period of time.

In a liquid treatment device according to a third aspect of the present disclosure, the liquid treatment device according to the first aspect further includes a holding block holding the first electrode and connected to the insulator, wherein the holding block has a structure sealing the first electrode.

With such a configuration, liquid or gas can be restrained from leaking from inside the space to the outside in a connecting portion connecting the holding block and the first electrode. As a result, since the gas can be discharged from the opening portion of the insulator, the plasma can certainly be generated in the gas present in the opening portion of the insulator to treat the liquid to be treated efficiently within a short period of time.

In a liquid treatment device according to a fourth aspect of the present disclosure, the holding block according to the third aspect includes a flow channel connecting the space formed between the first electrode and the insulator to the supply device.

With such a configuration, the supply device can be attached to the holding block and liquid or gas can easily be supplied through the flow channel to the space between the first electrode and the insulator. Since the holding block can be made of an easily processable material, a process cost for disposing the flow channel can be reduced.

In a liquid treatment device according to a fifth aspect of the present disclosure, the first electrode according to a first aspect has therein a flow channel connecting the space formed between the first electrode and the insulator to the supply device.

With such a configuration, the supply device can be attached to the first electrode and liquid or gas can easily be supplied through the flow channel to the space between the first electrode and the insulator.

In a liquid treatment device according to a sixth aspect of the present disclosure, the opening portion of the insulator according to the first aspect is disposed in an opening direction that is a vertically upper direction relative to a side surface of the insulator.

With such a configuration, since bubble clogging of air bubbles can be suppressed in the vicinity of the opening portion, the plasma can efficiently be generated.

In a liquid treatment device according to an seventh aspect of the present disclosure, a plurality of the opening portions of the insulator according to the first aspect are arranged at the insulator.

With such a configuration, since the plasma can be generated from a plurality of the opening portions, the plasma can more efficiently be generated.

In a liquid treatment device according to an eighth aspect of the present disclosure, the liquid treatment device according to the first aspect further includes a first tank storing the liquid to be treated.

With such a configuration, the liquid treatment device with improved usability can be provided.

In a liquid treatment device according to a ninth aspect of the present disclosure, the treatment device according to the eighth aspect further includes a second tank connected to the first tank by a circulating pump and pipe.

With such a configuration, the liquid treatment device can treat a larger volume of the liquid to be treated.

In a liquid treatment device according to a tenth aspect of the present disclosure, the second tank according to the ninth aspect is connected to ground.

With such a configuration, the liquid treatment device of the present disclosure can suppress an electric shock.

A system according to an eleventh aspect of the present disclosure with a cleaning or purifying function includes the liquid treatment device according to the first aspect.

With such a configuration, the liquid to be treated can be treated efficiently within a short period of time in a system with a cleaning or purifying function including the liquid treatment device of the present disclosure.

A liquid treatment method according to a twelfth aspect of the present disclosure includes:

supplying a liquid to a space formed between a first electrode and an insulator having an opening portion through a path which is different from an opening portion, wherein the insulator is disposed around the first electrode through the space, and the opening portion is disposed in contact with a liquid to be treated; and applying voltage between the first electrode and a second electrode to generate plasma in the opening portion of the insulator, wherein the second electrode is disposed in the liquid to be treated.

With such a configuration, since the plasma can efficiently be generated and long-life OH radicals can be generated, the liquid to be treated can be treated within a short period of time. The product generated by the plasma can be controlled by supplying a liquid to a space formed by the first electrode and the insulator. As a result, since the product can be generated depending on the liquid to be treated, a substance in the liquid to be treated can efficiently be decomposed.

In a liquid treatment method according to a thirteenth aspect of the present disclosure, after the space is filled with the liquid by supplying the liquid according to the twentieth aspect, the voltage is applied between the first electrode and the second electrode to evaporate the liquid in the space so as to generate a gas, and to discharge in the gas when the gas is released from the opening portion of the insulator into the liquid to be treated so as to generate the plasma in the gas.

With such a configuration, since the plasma can efficiently be generated and long-life OH radicals can be generated, the liquid to be treated can be treated within a short period of time. Since a space formed between the first metal electrode and the insulator is filled with the liquid, air in the space can be removed. As a result, as compared to the case of filling the space with air, an amount of the nitrogen compound generated by the plasma can be reduced. In other words, an amount of the nitrogen compound generated by the plasma can be controlled by the liquid treatment method of the present disclosure.

(Circumstances Leading to One Embodiment According to the Present Disclosure)

Figure 8:
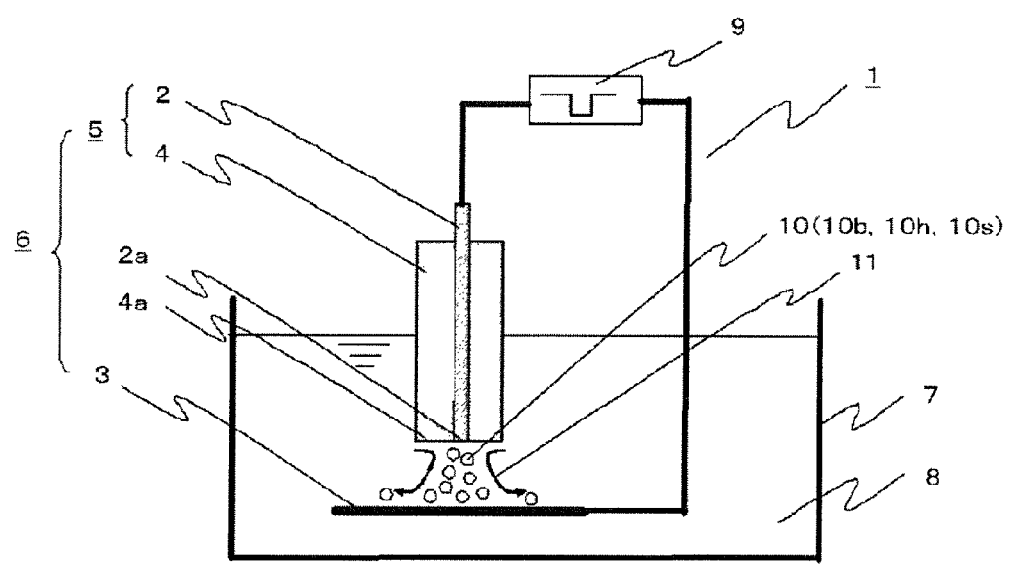
FIG. 8 shows a schematic of a general configuration of a conventional sterilizing device using a high voltage pulse discharge.

As described in the section of "DESCRIPTION OF THE RELATED ART", the sterilizing device of Patent Literature 1 shown in FIG. 8 instantaneously vaporizes a liquid by using the flash boiling phenomenon and causes a discharge between the bar-shaped high voltage electrode 2 and the plate-shaped grounding electrode 3 disposed oppositely to each other, thereby generating plasma. However, since an energy for vaporizing the liquid must be applied to cause the flash boiling phenomenon, the device has a problem that a long time is taken for treatment of liquid because the plasma cannot efficiently be generated.

The device of Patent Literature 2 or Patent Literature 3 generates air bubbles in a liquid by supplying a gas into the liquid for generating plasma and applies a high voltage between the electrodes to cause a discharge in the air bubbles, thereby generating the plasma. The device of Patent Literature 2 or Patent Literature 3, however, has a problem that a liquid treatment cannot efficiently be performed because products (such as electrons, ions, or radicals) generated by the plasma are not generated in accordance with a substance contained in a liquid that should be treated (a liquid to be treated).

Therefore, the present inventors found a configuration having a supply device supplying a fluid controlling a product generated by plasma into a space formed between a first metal electrode and an insulator. In this configuration, a fluid can be supplied from the supply device to the space between the first metal electrode and the insulator to control the product generated by plasma depending on a liquid that should be treated (a liquid to be treated). As a result, the liquid treatment can be performed efficiently within a short period of time.

Embodiments of the present disclosure are described with reference to the drawings. In all the following figures, the same or equivalent portions are denoted by the same reference numerals and are not redundantly be described.

First Embodiment

Overall Configuration

An overall configuration of a liquid treatment device 100 according to a first embodiment of the present disclosure is described.

FIG. 1 shows a schematic of an overall configuration of the liquid treatment device 100 according to the first embodiment of the present disclosure. As shown in FIG. 1, the liquid treatment device 100 according to the first embodiment includes a first metal electrode 101, a second metal electrode 102, an insulator 103, a power source 104, and a supply device 105. The liquid treatment device 100 according to the first embodiment may further include a first tank 106 and a second tank 107. In the first embodiment of the following description, the liquid treatment device 100 includes the first tank 106 and the second tank 107, and the first tank 106 and the second tank 107 are connected through a pipe 109 to a circulating pump 108.

As shown in FIG. 1, the first tank 106 and the second tank 107 are filled with a liquid that is treated (a liquid to be treated) 110 and are connected through the pipe 109 to the circulating pump 108. One wall of the first tank 106 is disposed with the first metal electrode 101 and the second metal electrode 102 penetrating through the wall. A portion of each of the first metal electrode 101 and the second metal electrode 102 is located in the liquid to be treated 110 in the first tank 106. An insulator 103 having an opening portion 112 and a holding block 113 holding the first metal electrode 101 are disposed such that a space 111 is formed around the first metal electrode 101. A flow channel 114 is disposed inside the holding block 113, and the supply device 105 and the space 111 are connected via this flow channel 114. A power source 104 is disposed between the first metal electrode 101 and the second metal electrode 102 for applying high voltage to cause a discharge at the opening portion 112 of the insulator 103 so as to generate plasma 115. As described above, the liquid treatment device 100 according to the first embodiment of the present disclosure is configured such that the supply device 105 supplies a fluid controlling the product generated by the plasma 115 into the space 111 between the first metal electrode 101 and the insulator 103.

[Electrode Configuration]

An electrode configuration around the first metal electrode 101 in the liquid treatment device 100 according to the first embodiment is described. An electrode configuration around the first metal electrode 101 in the first embodiment includes the first metal electrode 101, the insulator 103, the supply device 105, and the holding block 113.

Figure 2:
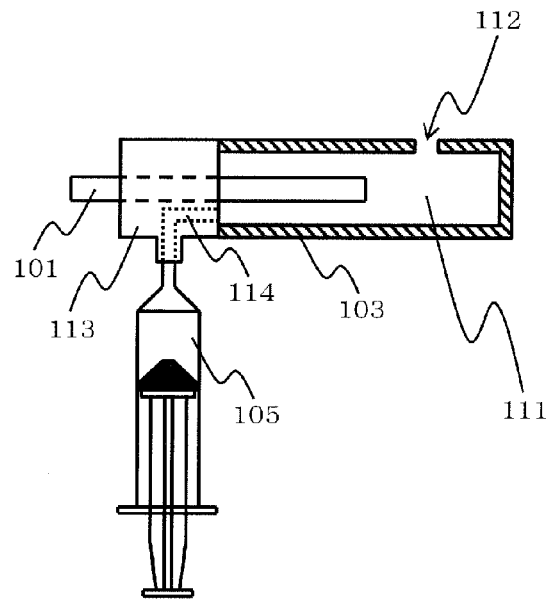
FIG. 2 shows a cross-sectional view of an electrode configuration around a first metal electrode in the first embodiment of the present disclosure.

FIG. 2 shows a cross-sectional view of the electrode configuration around the first metal electrode 101 in the first embodiment. As shown in FIG. 2, the insulator 103 is disposed around the first metal electrode 101 such that the space 111 is formed therebetween. The insulator 103 has the at least one opening portion 112 to allow the inside of the first tank 106 to communicate with the space 111. The holding block 113 holding the first metal electrode 101 is disposed at the end portion of the insulator 103. The holding block 113 is provided with the flow channel 114 connecting the supply device 105 supplying the fluid and the space 111. The flow channel 114 bent at a right angle is disposed in the holding block 113 by way of example in FIG. 2, but not limited to this. The flow channel 114 may have any shape capable of supplying the fluid from the supply device 105 to the space 111 between the first metal electrode 101 and the insulator 103.

Figure 3:
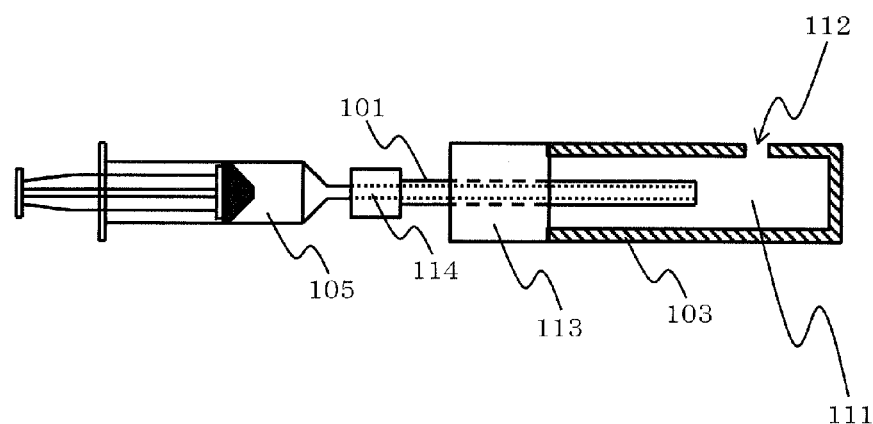
FIG. 3 shows a cross-sectional view of an electrode configuration around another first metal electrode in the first embodiment of the present disclosure.

FIG. 3 shows a cross-sectional view of an electrode configuration around another first metal electrode 101 in the first embodiment. As shown in FIG. 3, the first metal electrode 101 may have the flow channel 114 disposed within the first metal electrode 101. For example, the first metal electrode 101 may be in a hollow shape having an opening end. The supply device 105 may be connected to an end portion of the first metal electrode 101 to supply the fluid from the supply device 105 via the flow channel 114 of the first metal electrode 101 to the space 111 between the first metal electrode 101 and the insulator 103.

As described above, the electrode configuration of the first embodiment is configured such that the supply device 105 supplies the fluid via the flow channel 114 disposed in the holding block 113 or the first metal electrode 101 to the space 111 between the first metal electrode 101 and the insulator 103. With this configuration, for example, the fluid can be easily be supplied from the supply device 105 disposed outside the first tank 106 to the space 111 between the first metal electrode 101 and the insulator 103. Since an easily processable member can be used for the holding block 113 in the electrode configuration shown in FIG. 2, a process cost for disposing the flow channel 114 can be reduced.

The constituent components in the first embodiment will be described.

<First Metal Electrode>

The first metal electrode 101 is at least partially disposed in the first tank 106 filled with the liquid to be treated 110. The first metal electrode 101 is held by the holding block 113. The first metal electrode 101 in the first embodiment has a column shape with a diameter of 0.95 mm. These are a diameter and a shape as an example of the first metal electrode 101. The diameter of the first metal electrode 101 may be any diameter as long as the plasma 115 is generated, and may be equal to or less than 2 mm. The shape of the first metal electrode 101 is not limited to the column shape and may be any shape such as a rectangular parallelepiped shape or a planar shape, for example. The first metal electrode 101 may be made of material such as iron, tungsten, copper, aluminum, platinum, or an alloy containing one or a plurality of metals selected from these metals. Yttrium oxide having an electrical resistivity of 1 to 30 Ωcm due to addition of a conductive substance may be thermally sprayed to a portion of the surface of the first metal electrode 101. The thermal spray of yttrium oxide has an effect of extending an electrode life. The first metal electrode 101 is disposed in the first tank 106 in the configuration described in the first embodiment, but the position of the first metal electrode 101 is not limited thereto. An electrode made of metal material is used as the first metal electrode 101 in the first embodiment, but not limited to this. The first metal electrode may be used that includes a material other than metal material, such as carbon.

As shown in an electrode configuration depicted in FIG. 3, the first metal electrode 101 may be provided with a flow channel 114 through which the fluid supplied from the supply device 105 flows. For example, the first metal electrode 101 may be in a hollow shape having an opening end.

<Second Metal Electrode>

The second metal electrode 102 is also at least partially disposed in the first tank 106 filled with the liquid to be treated 110. The second metal electrode 102 is not limited in terms of the disposed position and may be disposed at any position in the first tank 106. The second metal electrode 102 may be made of any conductive metal material. For example, as is the case with the first metal electrode 101, the second metal electrode 102 may be made of material such as iron, tungsten, copper, aluminum, platinum, or an alloy containing one or a plurality of metals selected from these metals. The second metal electrode 102 is disposed in the first tank 106 in the configuration described in the first embodiment, but the position of the second metal electrode 102 is not limited thereto. For example, the second metal electrode 102 needs to have at least a portion disposed in the liquid to be treated 110. An electrode made of metal material is used as the second metal electrode 102 in the first embodiment, but not limited to this. The second metal electrode may be used that includes a material other than metal material, such as carbon.

<Insulator>

The insulator 103 is disposed such that the space 111 is formed around the first metal electrode 101. The insulator 103 is provided with the opening portion 112 to allow the inside of the first tank 106 to communicate with the space 111. Therefore, the insulator 103 is disposed around the first metal electrode 101 with the space 111 therebetween and has the opening portion 112 in a position in contact with the liquid to be treated 110. The position in contact with the liquid to be treated 110 may be any portion of the insulator 103 disposed (immersed) in the liquid to be treated 110, for example. The opening portion 112 has a function of generating an air bubble 116 in the liquid to be treated 110 in the first tank 106. The insulator 103 of the first embodiment has, by way of example, a cylindrical shape with an inner diameter of 1 mm and an outer diameter of 2 mm and is provided with the one opening portion 112 with a diameter of 0.7 mm. The insulator 103 is not limited to the size or the shape described above and may have any size or shape as long as the space 111 can be formed around the first metal electrode 101. For example, the diameter of the opening portion 112 is 0.7 mm in the first embodiment, but not limited to this, the diameter may be an arbitrary size equal to or less than 2 mm. The insulator 103 may include a plurality of the opening portions 112. The position of the opening portion 112 is not particularly limited and can be provided in a vertically upper direction (an upper direction of FIGS. 1 to 3) relative to a side surface of the insulator 103. By setting the opening direction of the opening portion 112 upward, the bubble clogging of the air bubbles 116 generated in the opening portion 112 can be prevented. The opening portion 112 may be disposed in an end surface of the insulator 103. The insulator 103 may be made of a material such as aluminum oxide, magnesium oxide, yttrium oxide, insulating plastic, glass, and quartz, for example.

<Power Source>

The power source 104 is disposed between the first metal electrode 101 and the second metal electrode 102. The power source 104 can apply pulse voltage or AC voltage between the first metal electrode 101 and the second metal electrode 102. The voltage waveform may have a pulse shape, a half sine wave shape, or a sine wave shape, for example.

<Supply Device>

The supply device 105 is disposed on the holding block 113 or the first metal electrode 101 as shown in FIG. 2 or 3. The supply device 105 supplies a fluid via the flow channel 114 disposed in the holding block 113 or the first metal electrode 101 to the space 111 formed between the first metal electrode 101 and the insulator 103. The fluid is liquid or gas for controlling the product generated by the plasma 115. The liquid is, for example, tap water or the liquid to be treated 110. The gas is, for example, He, $O_2$, or air. The liquid or gas is arbitrarily selected for generating a product corresponding to a substance contained in the liquid to be treated 110. The supply device 105 can be implemented by using a syringe shown in FIG. 2 or 3 as well as a pump, for example.

<First Tank>

The first tank 106 is used for storing the liquid to be treated 110. The volume of the first tank 106 and the second tank 107 is about 600 milliliters in total. The liquid to be treated 110 in the first tank 106 is circulated by the circulating pump 108 and the pipe 109 as described above. The circulating speed of the liquid to be treated 110 is set to an appropriate value from a decomposition rate of a substance to be decomposed by the plasma 115 and the volume of the first tank 106.

<Second Tank>

The second tank 107 is connected, for example, via the circulating pump 108 and the pipe 109 to the first tank 106. The second tank 107 may be used for a water clarification device, an air conditioner, a humidifier, a washing machine, an electric razor washer, or a dish washer, for example. The second tank 107 may be connected to ground so as to suppress an electric shock.

<Holding Block>

The holding block 113 is connected to one end portion of the insulator 103. The holding block 113 holds the first metal electrode 101. The holding block 113 may have a structure of sealing so as to prevent leakage of the fluid supplied from the supply device 105 into the space 111 in the portion connecting to the first metal electrode 101. For example, the structure may be achieved such that the first metal electrode 101 is screwed to the holding block 113. The sealing structure is not limited thereto and may be any structure.

As shown in FIG. 2, the flow channel 114 may be disposed inside the holding block 113. With this configuration, the fluid may be supplied from the supply device 105 via the flow channel 114 disposed in the holding block 113 to the space 111.

<Liquid Treatment Method>

A liquid treatment method using the liquid treatment device 100 according to the first embodiment is described.

Before starting the liquid treatment, the fluid controlling the product generated by the plasma 115 is supplied from the supply device 105 via the flow channel 114 to the space 111 formed between the first metal electrode 101 and the insulator 103. The case of using liquid and the case of using gas as the fluid supplied from the supply device 105 are separately be described.

<Case of Using Liquid as Supplied Fluid>

The case of using liquid as the supplied fluid will be described.

If the fluid supplied from the supply device 105 is liquid, the supply device 105 supplies the liquid via the flow channel 114 to the space 111 to achieve a state of the space 111 filled inside with the liquid. In particular, before the power source 104 applies voltage between the first metal electrode 101 and the second metal electrode 102, the state of the space 111 filled inside with the liquid is formed. The state of the space 111 filled inside with the liquid is not limited to a state of the space 111 filled inside with the liquid supplied from the supply device 105 and includes a state of the space 111 filled inside with liquid in which the liquid supplied from the supply device 105 is mixed with the liquid to be treated 110 of the first tank 106.

The power source 104 applies voltage between the first metal electrode 101 and the second metal electrode 102.

The electric power input from the first metal electrode 101 increases the temperature of the liquid in the space 111. Because of this temperature increase, the liquid in the space 111 is evaporated to generate a gas. The generated gas gathers in the space 111 and is discharged due to a pressure difference between the pressure inside the space 111 and the pressure of the first tank 106 from the opening portion 112 disposed in the insulator 103 to the liquid to be treated 110 in the first tank 106.

When this gas passes through the opening portion 112, the gas replaces the liquid in the vicinity of the opening portion 112 with gas, insulating the first metal electrode 101 and the second metal electrode 102 conducted through the liquid. At this point, the high voltage from the power source 104 is applied to the gas present in the opening portion 112 and a discharge occurs due to electric field concentration. As a result, the plasma 115 is generated in the gas present in the opening portion 112. Once the plasma 115 is generated, the plasma 115 is continuously and serially generated and the gas containing the plasma 115 is discharged from the opening portion 112 of the insulator 103 into the liquid to be treated 110 in the first tank 106. The plasma 115 is put into a state of projecting from the opening portion 112 of the insulator 103 into the liquid to be treated 110 in the first tank 106. Therefore, the first embodiment achieves a state in which the plasma 115 is generated in the opening portion 112 of the insulator 103.

Moreover, the gas containing the plasma 115 projecting from the opening portion 112 is partially separated to generate a plurality of the air bubbles 116. The air bubbles 116 are dispersed in the liquid to be treated 110 in the first tank 106. The plurality of the air bubbles 116 contains electrons, ions, or radicals generated by the plasma 115. The plurality of the air bubbles 116 sterilizes the liquid to be treated 110 and/or decomposes a chemical substance contained in the liquid to be treated 110. The generation of electrons, ions, or radicals contained in the plurality of the air bubbles 116 can be controlled by the liquid (fluid) supplied by the supply device 105.

<Case of Using Gas as Supplied Fluid>

The case of using gas as the supplied fluid is described.

If the fluid supplied from the supply device 105 is gas, the supply device 105 supplies the gas via the flow channel 114 to the space 111 to achieve a state of the space 111 filled inside with the gas. In particular, before the power source 104 applies voltage between the first metal electrode 101 and the second metal electrode 102, the state of the space 111 filled inside with the gas is formed. The state of the space 111 filled inside with the gas is not limited to a state of the space 111 filled inside with the gas supplied from the supply device 105 and includes a state of the space 111 filled inside with gas in which the gas supplied from the supply device 105 is mixed with gas originally present in the space 111 (e.g., air, or gas generated by vaporization of the liquid to be treated 110).

The power source 104 applies voltage between the first metal electrode 101 and the second metal electrode 102.

The high voltage from the power source 104 is applied to the gas present in the opening portion 112 and a discharge occurs in the gas due to electric field concentration. As a result, the plasma 115 is generated in the gas. Once the plasma 115 is generated, the plasma 115 is continuously and serially generated and the gas containing the plasma 115 is discharged from the opening portion 112 of the insulator 103 toward the liquid 110 in the first tank 106. The plasma 115 is put into a state of projecting from the opening portion 112 of the insulator 103 into the liquid to be treated 110 in the first tank 106. Therefore, the first embodiment achieves a state in which the plasma 115 is generated in the vicinity of the opening portion 112 of the insulator 103. The vicinity of the opening portion 112 means the opening portion 112 and a region in the gas extended from the opening portion 112 into the liquid to be treated 110.

Moreover, the gas containing the plasma 115 projecting from the opening portion 112 is partially separated to generate a plurality of the air bubbles 116. The air bubbles 116 are dispersed in the liquid to be treated 110 in the first tank 106. The plurality of the air bubbles 116 contains electrons, ions, or radicals generated by the plasma 115. The plurality of the air bubbles 116 sterilizes the liquid to be treated 110 and/or decomposes a chemical substance contained in the liquid to be treated 110. The generation of electrons, ions, or radicals contained in the plurality of the air bubbles 116 can be controlled by the liquid (fluid) supplied by the supply device 105.

[Effects (Product and Decomposition Rate)]

Effects (a product and a decomposition rate) of the liquid treatment device 100 of the first embodiment of the present disclosure are described. Two cases are discussed. One is the case of filling the space 111 formed between the first metal electrode 101 and the insulator 103 with air 117 before the treatment of the liquid to be treated 110. The other is the case of filling the space 111 with the liquid to be treated 110 before the treatment of the liquid to be treated 110. The case of filling the space 111 with the air 117 supplied from the supply device 105 is described as Example 1 and the case of filling the space 111 with the liquid to be treated 110 supplied from the supply device 105 is described as Example 2. Also, a difference in the product due to power consumption is described as a reference by using Reference Examples 1 and 2.

Examples 1 and 2 are described.

Example 1

Figure 4:
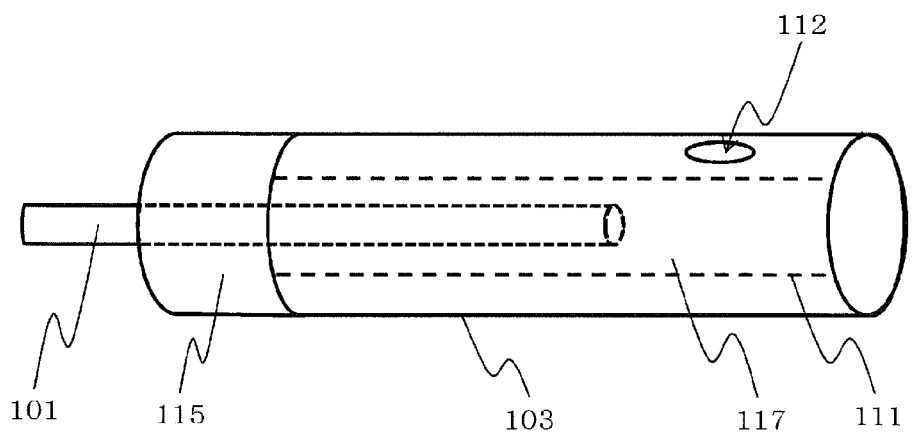
FIG. 4 shows a diagram of a state in which a space formed between the first metal electrode and an insulator is filled with a gas in the first embodiment of the present disclosure.

In Example 1, the liquid treatment was performed in the liquid treatment device 100 in the first embodiment shown in FIG. 1 in the state of filling the space 111 formed between the first metal electrode 101 and the insulator 103 with the air 117 supplied from the supply device 105. FIG. 4 shows the state of filling the space 111 formed between the first metal electrode 101 and the insulator 103 with the air 117 supplied from the supply device 105 in the first embodiment. As shown in FIG. 4, the space 111 was filled with the air 117 supplied from the supply device 105 in Example 1. The liquid to be treated 110 of Example 1 was at a $CH_3COOH$ concentration of 1 ppm and an electric conductivity of 19.2 mS/m. In Example 1, the power source 104 applies pulse voltage with power consumption of 300 W, a pulse width of 1 μs, and a frequency of 30 kHz.

Example 2

Figure 5:
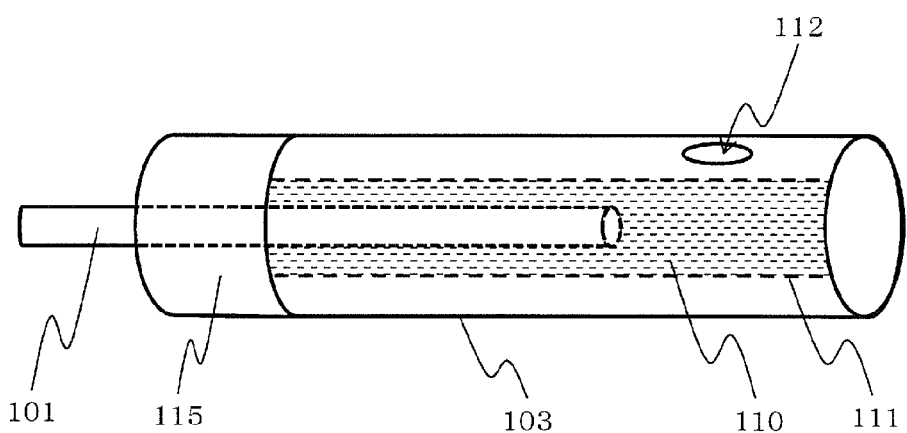
FIG. 5 shows a diagram of a state in which the space formed between the first metal electrode and the insulator is filled with a liquid in the first embodiment of the present disclosure.

In Example 2, the liquid treatment was performed in the state of filling the space 111 with the liquid to be treated 110 supplied from the supply device 105. FIG. 5 shows the state of filling the space 111 formed between the first metal electrode 101 and the insulator 103 with the liquid to be treated 110 supplied from the supply device 105 in the first embodiment. As shown in FIG. 5, the space 111 was filled with the liquid to be treated 110 supplied from the supply device 105 to remove air in Example 2. The other conditions are the same as Example 1.

Reference Examples 1 and 2 are described.

Reference Example 1

Reference Example 1 is different from Example 1 in that the power consumption is 30 W. The other conditions are the same as Example 1. Therefore, in the Reference Example 1, the power source 104 applied the pulse voltage with power consumption of 30 W, a pulse width of 1 μs, and a frequency of 30 kHz in the state of filling the space 111 with the air 117 supplied from the supply device 105 as shown in FIG. 4. The liquid to be treated 110 of Reference Example 1 was at a $CH_3COOH$ concentration of 1 ppm and an electric conductivity of 19.2 mS/m as is the case with Examples 1 and 2.

Reference Example 2

Reference Example 2 is different from Example 2 in that the power consumption is 30 W. The other conditions are the same as Example 2. Therefore, in the Reference Example 2, the power source 104 applied the pulse voltage with power consumption of 30 W, a pulse width of 1 μs, and a frequency of 30 kHz in the state of filling the space 111 with the liquid to be treated 110 supplied from the supply device 105 as shown in FIG. 5. The liquid to be treated 110 of Reference Example 2 was at a $CH_3COOH$ concentration of 1 ppm and an electric conductivity of 19.2 mS/m as is the case with Examples 1 and 2.

Products generated by the plasma treatment (liquid treatment) in Examples 1 and 2 and Reference Examples 1 and 2 are discussed. Also, generation amounts thereof are discussed.

To measure concentrations of various ions contained in the liquid having undergone the plasma treatment (the liquid treatment) in Examples 1 and 2 and Reference Examples 1 and 2, ion chromatography (DX-500, manufactured by Dionex) was used for the measurement.

Figure 6:
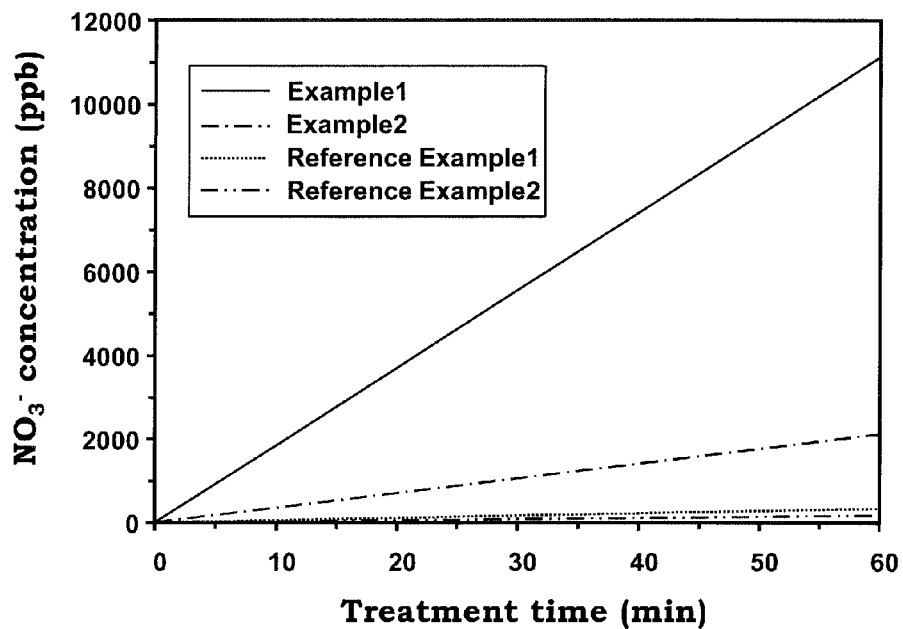
FIG. 6 shows a diagram of time dependency of concentration of $NO_3^-$ contained in a plasma treatment liquid in the first embodiment of the present disclosure.

FIG. 6 shows time dependency of concentration of $NO_3^-$ contained in the plasma treatment liquid in Examples 1 and 2 and Reference Examples 1 and 2. As shown in FIG. 6, in the plasma treatment liquid of Example 1 from the liquid treatment performed in the state of filling the space 111 with the air 117 supplied from the supply device 105, the concentration of $NO_3^-$ is higher as compared to Example 2. The generation rate of $NO_3^-$ of Example 1 is $8 \times 10^{-5}$ g/(min·W) or more. On the other hand, in the plasma treatment liquid of Example 2 from the liquid treatment performed in the state of filling the space 111 with the liquid to be treated 110 supplied from the supply device 105, the concentration of $NO_3^-$ is lower as compared to Example 1 and the generation rate of $NO_3^-$ is $8 \times 10^{-5}$ g/(min·W) or less. From the above, it is understood that when the liquid treatment is performed in the state of filling the space 111 with the air 117 supplied from the supply device 105, $NO_3^-$ is likely to be generated as the product. On the other hand, it is understood that when the liquid treatment is performed in the state of filling the space 111 with the liquid to be treated 110 supplied from the supply device 105, the generation amount of $NO_3^-$ is reduced as compared to Example 1. This is because the energy of the plasma is preferentially consumed by the process of generating a nitrogen compound through activation of $N_2$ contained in the air 117 in the space 111 in a place where the plasma is generated (a plasma generation field) in Example 1. Although $NO_3^-$ was generated in Example 2 since $N_2$ dissolved in the liquid to be treated 110 exists, $NO_3^-$ is not generated if $N_2$ is not dissolved in the liquid to be treated 110.

With regard to Reference Examples 1 and 2 of the plasma treatment performed at power consumption of 30 W, it is understood that the concentration of $NO_3^-$ is drastically reduced as compared to Examples 1 and 2 of the plasma treatment performed at power consumption of 300 W. A comparison is then be made between Reference Examples 1 and 2, i.e., between the state of filling the space 111 with the air 117 supplied from the supply device 105 and the state of filling the space 111 with the liquid to be treated 110 supplied from the supply device 105. It is understood that the concentration of $NO_3^-$ is higher in the state of filling the space 111 with the air 117 supplied from the supply device 105 (Reference Example 1) as compared to the state of filling the space 111 with the liquid to be treated 110 supplied from the supply device 105 (Reference Example 2). From the above, it is understood that while the space 111 is filled with the air 117 supplied from the supply device 105, the energy of the plasma is preferentially consumed by the process of generating a nitrogen compound through activation of $N_2$ contained in the air 117 in the place where the plasma is generated (the plasma generation field) also in the case of the power consumption of 30 W.

The decomposition rate of the plasma treatment liquid of Examples 1 and 2 is described by taking decomposition of $CH_3COOH$ as an example.

Figure 7:
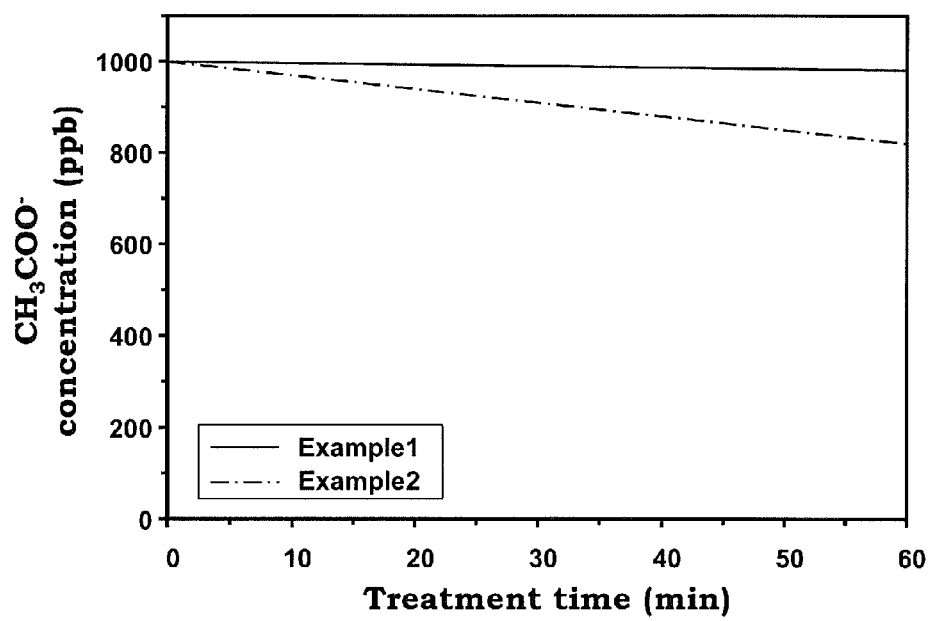
FIG. 7 shows a diagram of time dependency of concentration of $CH_3COO^-$ contained in the plasma treatment liquid in the first embodiment of the present disclosure.

FIG. 7 shows time dependency of concentration of $CH_3COO^-$ contained in the plasma treatment liquid in Examples 1 and 2. As shown in FIG. 7, comparing Example 1 with Example 2, it is understood that the concentration of $CH_3COO^-$ is lower in the Example 2 in the state of filling the space 111 with the liquid to be treated 110 supplied from the supply device 105. It is also understood from FIG. 7 that while the decomposition rate of $CH_3COOH$ of Example 2 is $1.3 \times 10^{-9}$ g/min or more, the decomposition rate of $CH_3COOH$ of Example 1 is $1.3 \times 10^{-9}$ g/min or less. This is because less $N_2$ is present in the place where the plasma is generated (the plasma generation field) in Example 2 as compared to Example 1 and, therefore, the energy of the plasma is efficiently consumed by the decomposition reaction of $CH_3COOH$ without being consumed by the process of producing the nitrogen compound.

As described above, the air 117 can be removed from the space 111 by achieving the state of filling the space 111 formed between the first metal electrode 101 and the insulator 103 with the liquid to be treated 110 supplied from the supply device 105. This enables provision of control such that the nitrogen compound generated by the plasma 115 is reduced as compared to when the air 111 is present in the space 111. As a result, the energy of the plasma 115 is efficiently consumed by a reaction of decomposition of the substance in the liquid to be treated 110 without being consumed by the process of producing the nitrogen compound.

The case of using He (helium) as the fluid supplied by the supply device 105 is described. It is found that when the liquid treatment is performed in the state of filling the space 111 formed between the first metal electrode 101 and the insulator 103 with He by the supply device 105, $H_2O_2$ is generated by the plasma 115. In the case of filling the space 111 with He, the generation rate of $H_2O_2$ in the plasma treatment liquid is about 7.5 times greater as compare to the case of filling the space 117 with the air 117 supplied from the supply device 105. Using He as the supplied fluid can accelerate the generation rate of $H_2O_2$ in this way and is therefore useful for bleaching or sterilization, for example.

The case of using $O_2$ as the fluid supplied by the supply device 105 is described. It is found that when the liquid treatment is performed with the space 111 filled with $O_2$ by the supply device 105, $H_2O_2$ is generated by the plasma 115. In the case of filling the space 111 with $O_2$, the generation rate of $H_2O_2$ in the plasma treatment liquid is about 9.2 times greater as compare to the case of filling the space 117 with the air 117 supplied from the supply device 105. Using $O_2$ as the supplied fluid can accelerate the generation rate of $H_2O_2$ in this way and is therefore useful for bleaching or sterilization, for example.

If the liquid treatment is performed with the space 111 filled with tap water by the supply device 105, $H_2O_2$ is generated by the plasma 115.

As described above, by using arbitrary liquid or gas as the fluid supplied by the supply device 105, the generation rate of the product such as $H_2O_2$ can be controlled.

[Effect (OH Radical Generation)]

An OH radical generation rate during the liquid treatment in Example 2 is described.

OH radicals are generated in the liquid treated in Example 2. The concentration of OH radicals in the plasma treatment liquid of Example 2 was measured by using an electron spin resonance spectrometer (JES-FA 300, JEOL Ltd.) with an ESR (electron spin resonance) method. To measure OH radicals with the ESR method, the OH radicals must be bound to a spin trapping agent called DMP. In this measurement, DMPO (5.5-dimethyl-1-pyrroline N-oxide, manufactured by Dojindo Laboratories) was used.

In Example 2, the time dependency of OH radicals was measured after the generation of the plasma 115 was started by applying the pulse voltage. As a result, it was found that the OH radical generation rate during the plasma treatment (liquid treatment) was $1 \times 10^{-8}$ mol/(min·W) or more. The time dependency is also measured after the generation of the plasma 115 was terminated by turning off the pulse power source. As a result, it was found that the life of the OH radicals was 5 minutes or longer and was about 10 minutes.

As described above, in the plasma treatment liquid having undergone the liquid process by the liquid treatment device 100 according to the first embodiment, OH radicals can continuously exist even after the stop of energization (discharge). As a result, a substance to be decomposed can efficiently be decomposed even after the stop of energization of the liquid treatment device 100 according to the first embodiment of the present disclosure.

As described above, if a liquid is treated by plasma (hereinafter, in-liquid plasma) generated in the liquid that should be treated (the liquid to be treated) 110 and has the $NO_3^-$ generation rate of $8 \times 10^{-5}$ g/(min·W) or less and the OH radical generation rate of $1 \times 10^{-8}$ mol/(min·W) or more, OH radicals can continuously exist even after the stop of energization (discharge). As a result, a substance in the liquid to be treated 110 can efficiently be decomposed.

As described above, since the liquid treatment device 100 according to the first embodiment of the present disclosure can efficiently generate the plasma 115 and can generate long-life OH radicals as compared to a conventional device, the liquid to be treated 110 can be treated within a short period of time. The liquid treatment device 100 according to the first embodiment has the configuration capable of supplying the fluid controlling the product generated by the plasma 115 to the space 111 between the first metal electrode 101 and the insulator 103 before treatment of the liquid to be treated 110. With this configuration, the liquid treatment device 100 according to the first embodiment can achieve the state of filling the space 111 with the fluid supplied from the supply device 105 before the liquid treatment and generate the product corresponding to the substance in the liquid to be treated 110 by the plasma 115. Therefore, the liquid treatment device 100 according to the first embodiment can use the fluid supplied by the supply device 105 to control the product generated by the plasma 115. The liquid treatment device 100 according to the first embodiment can treat the liquid to be treated 110 with the product efficiently within a short period of time.

When the fluid supplied from the supply device 105 in the first embodiment is the liquid to be treated 110, the space 111 formed between the first metal electrode 101 and the insulator 103 is filled with the liquid to be treated 110 supplied from the supply device 105. Therefore, the air in the space 111 can be removed before the liquid treatment. As a result, an amount of the nitrogen compound generated by the plasma 115 can be reduced as compared to the case of filling the space 111 with the air 117. Therefore, when the liquid to be treated 110 is used as the fluid supplied from the supply device 105, an amount of the nitrogen compound generated by the plasma 115 can be controlled.

When the fluid supplied from the supply device 105 in the first embodiment is gas, such as He, and $O_2$, the plasma 115 generates $H_2O_2$. $H_2O_2$ is useful for bleaching or sterilization, for example. As described above, by using arbitrary gas as the gas supplied from the supply device 105 depending on the liquid to be treated 110, the product generated by the plasma 115 can be controlled. As a result, the substance in the liquid to be treated 110 can be decomposed efficiently within a short period of time.

The liquid treatment device 100 according to the first embodiment has the holding block 113 at the end portion of the insulator 103 to hold the first metal electrode 101. The connecting portion between the first metal electrode 101 and the holding block 113 preferably has a sealing structure, such as a screwing structure. Such a structure can prevent the fluid from leaking to the outside in the connecting portion between the first metal electrode 101 and the holding block 113. The gas is released from the opening portion 112 of the insulator 103 and the plasma 115 can certainly be generated in the gas present in the opening portion 112.

The flow channel 114 in the first embodiment is disposed inside the holding block 113 or the first metal electrode 101. With this configuration, the fluid can easily be supplied from the supply device 105 via the flow channel 114 to the space 111 between the first metal electrode 101 and the insulator 103. Since the holding block 113 can be made of an easily processable material, the process cost for providing with the flow channel 114 can be reduced.

Since the opening direction of the opening portion 112 of the insulator 103 in the first embodiment is set to the vertically upper direction relative to the side surface of the insulator 103, the bubble clogging of the air bubbles 116 can be prevented in the vicinity of the opening portion 112. A plurality of the opening portions 112 can be arranged at the insulator 103. As a result, the plasma 115 can efficiently be generated from the opening portions 112.

The liquid treatment device 100 according to the first embodiment has the first tank 106 and the second tank 107 connected through the pipe 109 to the circulating pump 108 therefore can treat a large volume of the liquid to be treated 110. The second tank 107 can be connected to ground to prevent an electric shock.

By using the second tank 107 in the first embodiment for a water clarification device, an air conditioner, a humidifier, a washing machine, an electric razor washer, a dish washer, a toilet, or water for hydroponic culture/a nutrient solution circulation device, the liquid treatment device 100 can be used for various electrical products etc. A system with a cleaning or purifying function including the liquid treatment device 100 of the first embodiment can be achieved.

The liquid treatment device 100 according to the first embodiment may be implemented in any embodiments. For example, embodiments include a liquid treatment method. According to this liquid treatment method, since the plasma 115 can efficiently be generated and long-life OH radicals can be generated, the liquid to be treated 110 can be treated within a short period of time. According to this liquid treatment method, any liquid or gas can be used depending on the liquid to be treated 110 as the fluid supplied from the supply device 105 to the space 111 to control the product generated by the plasma 115. For example, an amount of the nitrogen compound generated by the plasma 115 can be controlled. The liquid to be treated 110 may be used as the fluid supplied from the supply device 105 so as to reduce the nitrogen compound. The air 117 may be used as the fluid supplied from the supply device 105 so as to increase the nitrogen compound. He (helium) and $O_2$ may be used as the fluid supplied from the supply device 105 so as to generate $H_2O_2$, as described above, the liquid treatment method according to the first embodiment can control the product generated by the plasma 115 depending on the liquid to be treated 110 and, therefore, the liquid to be treated 110 can be treated within a short period of time.

The liquid (plasma treatment liquid) treated by the liquid treatment device 100 according to the first embodiment and the liquid treatment method has long-life OH radicals continuously existing after the stop of energization (discharge). As a result, the liquid to be treated 110 can be treated efficiently within a short period of time.

The liquid treated by the liquid treatment device 100 according to the first embodiment, i.e., the liquid treated by the plasma (the in-liquid plasma) generated in the liquid, has long-life OH radicals continuously existing after the stop of energization (discharge). As a result, the liquid to be treated 110 can be treated efficiently within a short period of time.

The liquid treatment device, the liquid treatment method, and the plasma treatment liquid according to the present disclosure can control a type of a product generated by plasma while efficiently generating the plasma so as to treat a liquid to be treated within a short period of time and, therefore, is useful as a water purifier for sewage treatment etc.

The invention claimed is:

1. A liquid treatment device comprising:
a first electrode;
a second electrode disposed in a liquid to be treated;
an insulator disposed around the first electrode with a space between the first electrode and the insulator, wherein the insulator has an opening portion in a position in contact with the liquid to be treated;
a power source applying voltage between the first electrode and the second electrode so as to generate plasma in the vicinity of the opening portion of the insulator; and
a liquid supply device supplying a liquid to the space through a path which is different from the opening portion before the power source applies the voltage.

2. The liquid treatment device of claim 1, wherein
the liquid supply device supplies the liquid to the space to form a state in which the space is filled with the liquid,
the power source applies voltage between the first electrode and the second electrode after the space is filled with the liquid to evaporate the liquid in the space so as to generate a gas, and to discharge in the gas when the gas is released from the opening portion of the insulator into the liquid to be treated so as to generate the plasma.

3. The liquid treatment device of claim 1, further comprising a holding block holding the first electrode and connected to the insulator,
wherein the holding block has a structure sealing the first electrode.

4. The liquid treatment device of claim 3, wherein the holding block includes a flow channel connecting the space formed between the first electrode and the insulator to the liquid supply device.

5. The liquid treatment device of claim 1, wherein the first electrode has therein a flow channel connecting the space formed between the first electrode and the insulator to the liquid supply device.

6. The liquid treatment device of claim 1, wherein the opening portion of the insulator is disposed in an opening direction that is a vertically upper direction relative to a side surface of the insulator.

7. The liquid treatment device of claim 1, wherein a plurality of the opening portions of the insulator are arranged at the insulator.

8. The liquid treatment device of claim 1, further comprising a first tank storing the liquid to be treated.

9. The liquid treatment device of claim 8, further comprising a second tank connected to the first tank by a circulating pump and pipe.

10. The liquid treatment device of claim 9, wherein the second tank is connected to ground.

11. A system with a cleaning or purifying function comprising: the liquid treatment device of claim 1.

12. A liquid treatment method comprising:
supplying a liquid to a space formed between a first electrode and an insulator having an opening portion through a path which is different from an opening portion, wherein the insulator is disposed around the first electrode through the space, and the opening portion is disposed in contact with a liquid to be treated; and
applying voltage between the first electrode and a second electrode to generate plasma in the opening portion of the insulator, wherein the second electrode is disposed in the liquid to be treated.

13. The liquid treatment method of claim 12, wherein after the space is filled with the liquid by supplying the liquid, the voltage is applied between the first electrode and the second electrode to evaporate the liquid in the space so as to generate a gas, and to discharge in the gas when the gas is released from the opening portion of the insulator into the liquid to be treated so as to generate the plasma in the gas.

14. The liquid treatment device of claim 1, wherein the first electrode does not directly contact the insulator.

15. The liquid treatment method of claim 12, wherein the first electrode does not directly contact the insulator.

* * * * *